US006983457B2

(12) United States Patent
Mitsumori et al.

(10) Patent No.: US 6,983,457 B2
(45) Date of Patent: Jan. 3, 2006

(54) COMPILE METHOD FOR STORING SOURCE CODE WITHIN OBJECT CODE

(75) Inventors: Masato Mitsumori, Yokohama (JP); Shinji Asaka, Yokohama (JP); Hiroyuki Hosotani, Yokohama (JP)

(73) Assignees: Hitachi, Ltd., Tokyo (JP); Hitachi Software Engineering Co., Ltd., Yokohama (JP)

( * ) Notice: Subject to any disclaimer, the term of this patent is extended or adjusted under 35 U.S.C. 154(b) by 621 days.

(21) Appl. No.: 09/810,191

(22) Filed: Mar. 19, 2001

(65) Prior Publication Data

US 2004/0205736 A1    Oct. 14, 2004

(30) Foreign Application Priority Data

Oct. 25, 2000   (JP) ............................. 2000-332110

(51) Int. Cl.
G06F 9/44     (2006.01)
G06F 9/45     (2006.01)
G06F 17/30    (2006.01)

(52) U.S. Cl. ...................... 717/145; 717/121; 717/162; 707/200

(58) Field of Classification Search ................ 717/140, 717/141, 143, 145, 106, 162, 163, 165, 121; 707/200

See application file for complete search history.

(56) References Cited

U.S. PATENT DOCUMENTS

| | | | | |
|---|---|---|---|---|
| 4,809,170 A | * | 2/1989 | Leblang et al. ............. | 717/122 |
| 5,170,465 A | * | 12/1992 | McKeeman et al. ........ | 717/145 |
| 5,182,807 A | * | 1/1993 | Mizuse et al. .............. | 717/122 |
| 5,204,960 A | | 4/1993 | Smith et al. | |
| 5,249,275 A | * | 9/1993 | Srivastava .................. | 717/137 |
| 5,287,548 A | * | 2/1994 | Flood et al. ................. | 700/18 |
| 5,325,531 A | | 6/1994 | McKeeman et al. | |
| 5,500,881 A | * | 3/1996 | Levin et al. ................ | 717/141 |
| 5,586,328 A | * | 12/1996 | Caron et al. ................ | 717/146 |
| 5,778,212 A | | 7/1998 | Dehnert et al. | |
| 5,850,554 A | * | 12/1998 | Carver ........................ | 717/162 |
| 5,854,932 A | * | 12/1998 | Mariani et al. ............. | 717/116 |

FOREIGN PATENT DOCUMENTS

| | | |
|---|---|---|
| EP | 0 856 788 A2 | 8/1998 |
| JP | 02201542 A * | 8/1990 |
| JP | 3-85639 | 4/1991 |
| JP | 8-87416 | 4/1996 |
| JP | 2000357097 A * | 12/2000 |
| JP | 2002082811 A * | 3/2002 |

(Continued)

OTHER PUBLICATIONS

Eric Youngdale, "Kernel Korner: The ELF Object File Format by Dissection", May 1995, Linux Journal, ISSN: 1075-3583, vol. 1995, Issue 13es, Article No. 15.*

(Continued)

Primary Examiner—Tuan Dam
Assistant Examiner—J. Derek Rutten
(74) Attorney, Agent, or Firm—Mattingly,Stanger,Malur & Brundidge, P.C.

(57) ABSTRACT

A compiler, that generates an object program file from a source program in which a plurality of procedures are written, compiles procedures, by regarding the procedures as source-program compile units, to generate corresponding object-program compile units. A plurality of object-program compile units generated are output to a memory together with the corresponding source-program compile units. When compiling a source program in which one procedure has been changed, the compiler compiles only the source-program compile unit corresponding to the changed procedure.

3 Claims, 7 Drawing Sheets

FOREIGN PATENT DOCUMENTS

| WO | 93/25963 | 12/1993 |
|----|----------|---------|
| WO | WO 00/23885 | * 4/2000 |

OTHER PUBLICATIONS

Bill Rosenblatt, "Learning the Korn Shell", Jun. 1993, O'Relly & Associates, ISBN 1-56592-054-6, Chapter 6, Section 6.1.*

Walter F. Tichy, "RCS—A System for Version Control", 1991, Purdue University, Technical Report.*

Menapace, Kingdom, and MacKenzie, "The stabs debug format", 1993, Free Software Foundation, Chapter 1-6.*

Executable and Linkable Format (ELF), Tool Interface Standard (TIS), Portable Formats Specification, Version 1.1, pp. I-34.

Tichy, W.F., Smart Recompilation, ACM Transcations on Programming Languages and Systems, New York, New York, US, vol. 8, No. 3, Jul. 1, 1986, pp. 273-291, XP000791131.

* cited by examiner

COMPILE METHOD FOR STORING SOURCE CODE WITHIN OBJECT CODE

BACKGROUND OF THE INVENTION

The present invention relates to a compile method of inputting a plurality of source program files into a compiler and storing a created object program as an object program file in memory.

Description is first made of a case where a conventional compiler receives a plurality of source program files that have respective file names. Suppose that only one procedure in a source program file is changed after the source program file, in which a plurality of procedures were written, were compiled. In this case, if the same source program file is recompiled, it follows that the conventional compiler compiles all procedures including those that have not been changed in the source program file.

As means for automatic execution of a compile process such as was mentioned above, a "make" tool is often used. The "make" tool is a tool to generate one object program file from a plurality of source program files, manages dates of a plurality of source program files, and compiles only source program files with dates later than that of an object program file. An example of this technique is disclosed in JP-A-08-87416.

The above-mentioned background art refers to dates of a plurality of source program files to decide if there have been changes made. Because the compiler receives source program files one file after another, even if one procedure was changed that does not affect the other procedures in one source program in which a plurality of procedures are written, the entire source program is compiled. Further, even if only the date of one source program file was changed, the compiler compiles all procedures in that source program file. A problem here is that a wasteful compile process is carried out and a compiling time is spent to not purpose.

SUMMARY OF THE INVENTION

An object of the present invention is to provide a compile method capable of eliminating a wasteful compile process. This object may be achieved by omitting the compile process on a procedure that has never been changed when a source program file is input, where the source program file includes the procedure to which no change has been made from a previous compile till compile this time.

To achieve the above object, a compiler according to the present invention comprises means for identifying a source program file having a plurality of procedures written therein, means for compiling only a compile unit corresponding to a procedure, in which a change has been made, in the source program file to generate an object-program compile unit corresponding to that source-program compile unit, and means for storing a plurality of object-program compile units together with the source program in one object program file. Note that even when a plurality of source program files with respective names are complied collectively, procedures changed may be identified by comparing a source program file with a corresponding source program file stored in the object program file with regard to each of the source program files without checking the file date.

Further, to achieve the above object, the compiler compares a source program that forms the input source program file with a corresponding source program compiled before and already stored in the object program file on a procedure basis, that is, one procedure after another in the source program to thereby identify a changed procedure. Then, by compiling only a procedure with a change made, an updated object program can be obtained. Subsequently, an updated object program and the source program used for compile this time are stored associated with each other in an object program file.

With regard to information used to identify a changed procedure (hereafter referred to as "source information"), not only the source program but also information used for analysis of the syntax of the source program, i.e., source information and the object program may be stored in the object program file.

The source information that is used for syntax analysis of the source program is the version of the compiler or an input option for example.

If the user recompiles the source program, the compiler first analyzes the syntax of the procedure being compiled, then, reads the corresponding source information stored in the object program file, and compares source information input to the compiler with the stored source information. If the comparison attests coincidence of both the source information, the compiler decides that there is no change in the procedure being compiled, and terminates the compile process. If the result of comparison shows that disagreement between the source information, the compiler decides that a source-program compile unit for a corresponding procedure has been changed, and compiles the changed procedure to generate an object-program compile unit. After this, the compiler updates the object-program compile unit for the procedure changed in the object program file to make it the same as the object-program compile unit generated by the compile this time. Further, the compiler updates the source information regarding the procedure stored in the object-program file to new source information. This new source information includes the updated source-program compile unit and information used to analyze the syntax of the source program input to the compiler.

As has been described, only a changed portion of a source program can be compiled instead of compiling the whole of the source program file specified by the compiler, which results in decreases in compiling time. Because a source program that was compiled is stored in an object program file, a user will feel almost the same operability as in the conventional compile methods and can obtain a merit of greatly decreased compiling time. When there are procedures with no changes made, which take a huge amount of time for the optimization process during compiling, a significant reduction of compile time can be achieved by recompiling only procedures to which changes have been made in compiling a source program including a plurality of procedures.

Even when a source program is deleted by mistake, it is possible to retrieve the source program from the object program file, the environment can be restored to what it was before the deletion.

DESCRIPTION OF THE EMBODIMENTS

An embodiment of the present invention will be described with reference to the accompanying drawings.

Figure 1:
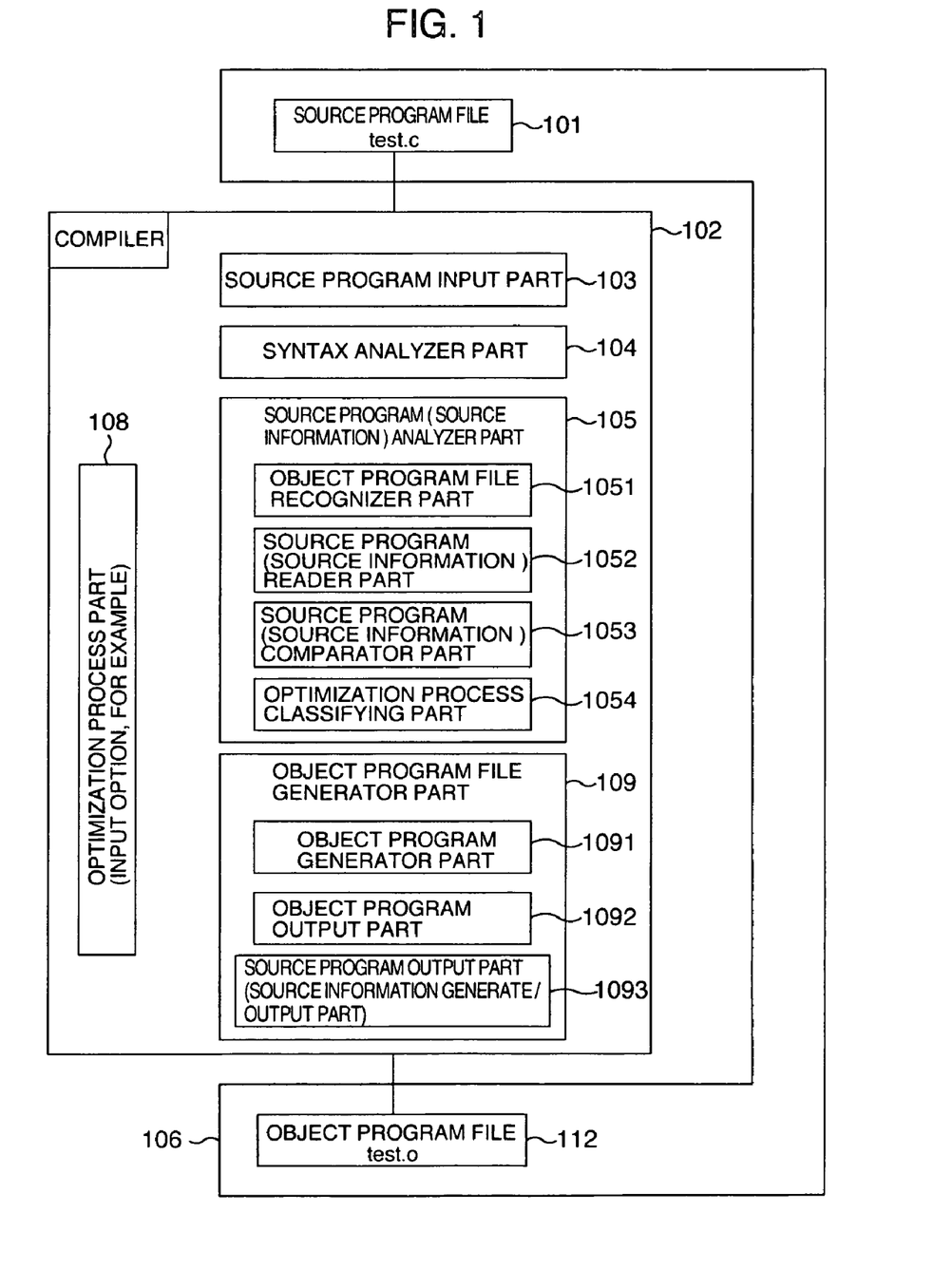
FIG. 1 is a block diagram of an embodiment of the compiler according to the present invention.

FIG. 1 a block diagram of the compiler of an embodiment of the present invention. A source program file (e.g., file name "test.c") 101 stored in a storage device 106 is transferred to a compiler 102 according to the present invention and is compiled. Then, an object program file (e.g., file name "test.o") 112 is output to the storage device 106. The structure of the object program file 112 is such that the object program file includes an object program generated by compiling and a source program corresponding to the object program as will be described later.

The compiler 102 comprises a source program input part 103, a syntax analyzer part 104, a source program analyzer part 105 and an object program file generator part 109. The source program input part 103 receives a source program to be compiled from the source program file 101. The syntax analyzer part 104 analyzes the syntax of the source program inputted, and decides whether or not the source program meets language specifications. The source program analyzer part 105 detects a changed portion of the input source program, and decides whether to compile the source program one procedure after another, and comprises an object program file recognizer part 1051, a source program reader part 1052, a source program comparator part 1053, and an optimization process classifying part 1054. The object program file generator part 109 compiles a source program one procedure after another, and outputs an object program generated by compiling and the source program corresponding to the object program to the object program file 112. The object program file generator part 109 comprises an object program generator part 1091, an object program output part 1092, and a source program output part 1093.

The object program file recognizer part 1051 checks if a source program, which corresponds to the source program file 101 to be compiled, exists in the object program file 112. The source program reader part 1052 reads a source program in the object program file 112 one procedure after another (functions, for example). The source program comparator part 1053 compares a read procedure of the source program from the object program file with a corresponding procedure of the source program specified by the compiler one procedure after another to detect any changed portion in the source program file 101. The optimization process classifying part 1054, when a changed portion is detected in the source program of the procedure to be compiled, instructs the optimization process part 108 to perform optimization. To increase the execution speed of the compiled source program, the optimization process part 108 analyzes the source program, eliminates meaningless process steps, and rearranges the process steps, for example. If specified, the optimization process part 108 performs a process to reduce the size of object programs generated. It is possible to specify levels at which optimization is carried out. The compiling time becomes longer depending on levels. This optimization process is normally input in the form of an input option during compiling.

The object program generator part 1091 compiles a source program subjected to the optimization process to generate an object program. The object program output part 1092 outputs object-program compile units generated by compiling, to the object program file 112. The object program output part 1093 outputs source-program compile units to the object program file 112.

Figure 2:
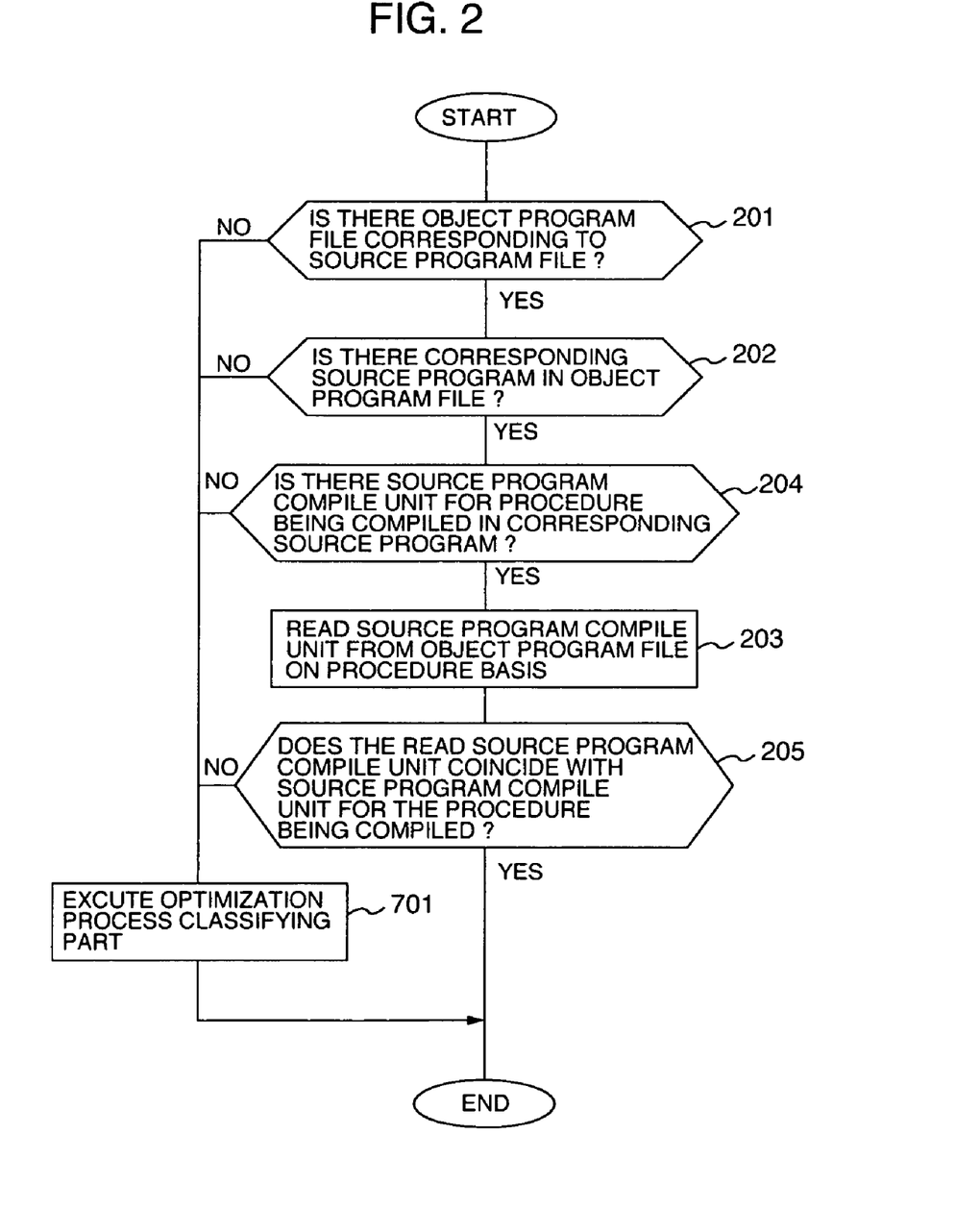
FIG. 2 is a flowchart of the source program analyzer part in the embodiment of the present invention.

FIG. 2 shows the flow of process steps in the source program analyzer part 105. A decision is made whether or not an object program file (e.g., "test.o") 112 exists which corresponds to the source program file (e.g., "test.c") 101 specified to the compiler (step 201) as the one to be compiled. If the decision made is that a corresponding object program file 112 does not exist, this is a case where the source program is compiled for the first time. In this case, because the source program of all procedures in the source program file 101 is compiled, a step 701, which will be described later, is carried out on all procedures. If there exists a corresponding object program file 112, a decision is made whether or not a source program, which was stored at its previous compiling, exists in the object program file 112 (step 202). If the result of decision at the step 202 is that the source program concerned does not exist in the object program file 112, the source program of all procedures in the source program file 101 is compiled and, therefore, the process in the step 701, described later, is carried out on all procedures. If the source program concerned exists in the object program file 112, a decision is made whether or not a source-program compile unit for the procedure being compiled exists in the object program file 112 (step 204). If the result of decision is that the source-program compile unit for the procedure being compiled does not exist, a decision is made that this procedure is newly added, and to compile this procedure, the process in the step 701, described later, is the carried out on this procedure. If there exists a source-program compile unit for the procedure being compiled, the source program corresponding to the source program file 101 as the object of compiling is read one procedure after another from the object program file 112 (step 203). Next, the source-program compile unit for the procedure being compiled is compared with the source-program compile unit for a corresponding procedure in the object program file 112 to decide whether they coincide with each other (step 205). If it is decided that there is disagreement between the source program of the procedure being compiled and the source program of a corresponding procedure in the object program file 112, a decision is made that the procedure concerned has been changed, and to compile the procedure concerned, the process in the next step 701 is carried out on the procedure. If they coincide with each other, the procedure concerned has not been changed, the procedure does not require compiling, so that the process in the step 701 is not carried out. Note that if a plurality of procedures in one source program have been changed, the process steps 203 and 204 should executed as many times as the procedures. In the step 701, the optimization process is to be carried out on a procedure of a source program where a change occurred, or on the source program itself. By performing the steps of the above-mentioned flowchart, a procedure being compiled can be searched for any change made and compiled when necessary. A decision can be made whether to compile or not on every procedure, so that those which are compiled and those which are not compiled can be separated.

Figure 3:
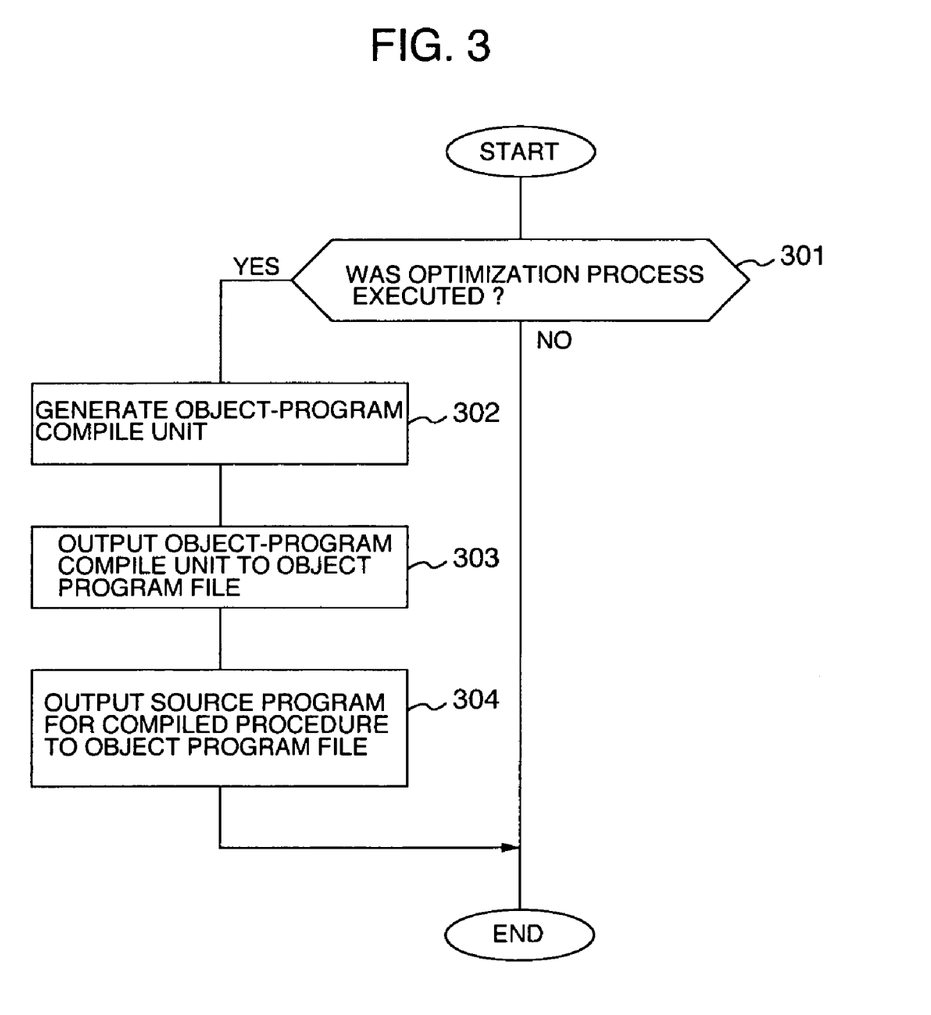
FIG. 3 is a flowchart of the object program file generator part in the embodiment of the present invention.

FIG. 3 is a flowchart for explaining the process of the object program file generator part 108. The source program analyzer part 105, which has been described, detects a change in a procedure of a source program and decides if the optimization process has been done on this procedure (step 301). If a decision result shows that there is a procedure subjected to the optimization process, steps 302, 303, 304 are carried out.

In a step 302, a procedure of the source program is compiled to generate an object-program compile unit. In a step 303, an object-program compile unit of the procedure compiled is output to the object program file 112. If an object-program compile unit for the procedure compiled exists in the object program file 112, the object-program compile unit is updated. In a step 304, the source-program compile unit for the procedure compiled is output to the object program file 112. At this time, if a source-program compile unit for the procedure compiled exists in the object program file 112, that source-program compile unit is updated. In the manner described, only changed procedures in the source program file 101 are compiled, object-program compile units generated by compiling are stored in the object program file 112, and corresponding source-program compile units are stored associated with the object-program compile units in the object program file 112.

Figure 4:
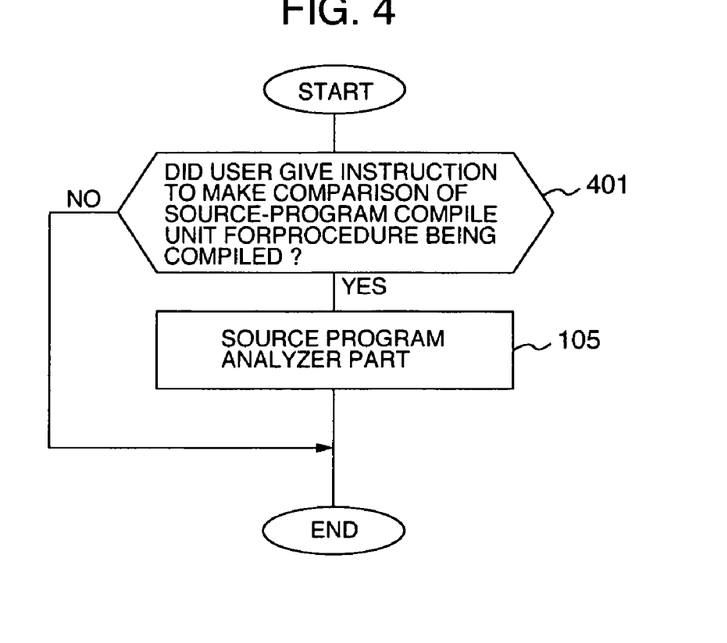
FIG. 4 is a flowchart when giving an instruction to compare source programs to the compiler in the embodiment of the present invention.

In the above example, a decision is made whether or not a source program file 101 specified as undergoing a compile process has its antecedent source program stored in the object program file 112 even when it is compiled for the first time. However, in such a case as mentioned above where, apparently, there is not its antecedent source program in the object program file 112, a process flow such as shown in FIG. 4 may be added. Namely, it may be arranged for the compiler to decide if there is an instruction to carry out a source program comparison (step 401). If there is an instruction not to carry out the comparison process, the compiler performs the optimization process and the compile process on all procedures without causing the source program analyzer part to carry out processes. Therefore, if it is known that the antecedent source program does not exist in the object program file 112, the processes in the source program analyzer part can be omitted, which results in saving in compiling time.

Figure 5:
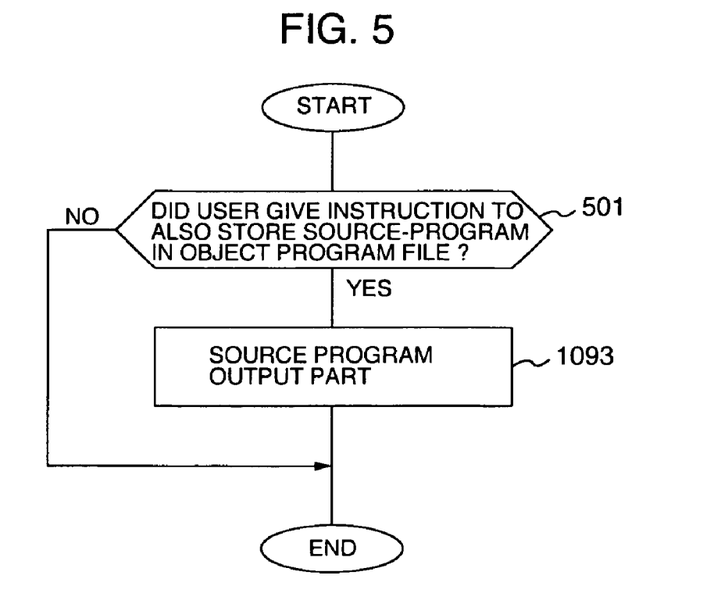
FIG. 5 is a flowchart when giving an instruction to output a source program to the compiler in the embodiment of the present invention.

The object program file contains object-program compile units for procedures and corresponding source-program compile units. However, if the source programs need not be stored, or if for example source programs should not be disclosed to others or need not be recompiled, a process flow such as shown in FIG. 5 may be added. Namely, the compiler may be adapted to decide whether or not an instruction is given by a user to store a source program in the object program file (step 501). If there is given an instruction to store a source program, as described above, a source-program compile unit corresponding to the object-program compile unit is output to the object program file 112. This makes it possible to prevent an unnecessary source program from being stored in the object program file. A source program of text format may be compressed so as not to be read easily or it may be encrypted to make it unreadable.

In the embodiment described above, a changed portion of a source program is detected in procedure units, a procedure including the changed portion is compiled, and the object-program compile unit compiled and a corresponding source-program compile unit are stored procedure by procedure in the object program file. When a source program is updated, normally, constants or variables referred to are often updated. In updates such as these, some codes are very often updated with the size of the object program remaining unchanged. Therefore, a change may be detected one step after another in a source program, and the compile process may be carried out only on the changed steps, and only updated portions may be rewritten in the stored object program and its corresponding source program in the object program file. In this case, a large proportion of compiling time can be saved. Further, if a change was made only in a portion in a source program that does not affect the contents of procedures, in other words, if for example only the comment was changed, that source-program compile unit may be compiled and output to the object program file, but the other related source-program compile units are not compiled.

Figure 6:
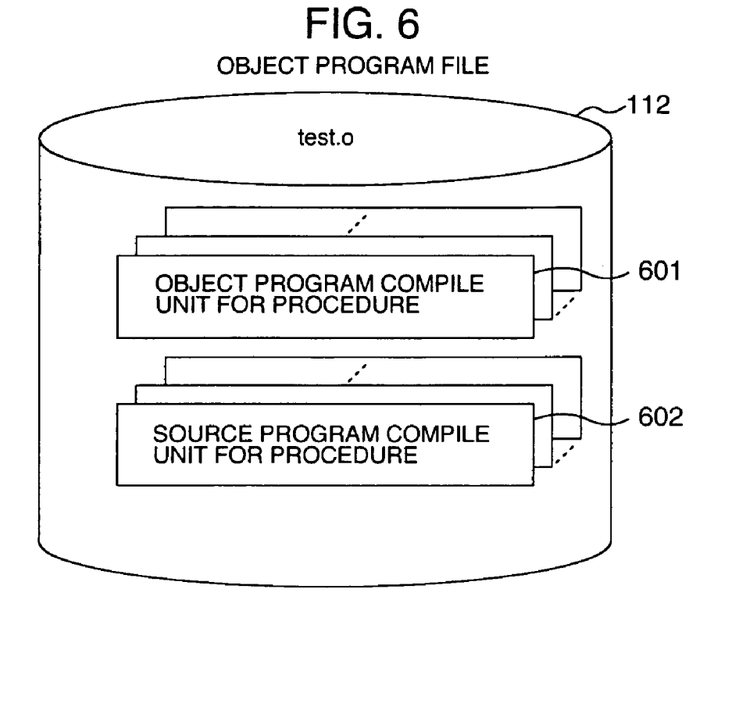
FIG. 6 is a diagram showing the structure of an object program file in the embodiment of the present invention.

Description will now be made in detail of an object program file output from the compiler according to the present invention. As shown in FIG. 6, the object program file 112 stored in the storage device 106 includes object-program compile units 601 and source-program compile units 602 collected in separate groups, so that the object-program compile units for the procedures may be updated easily and that all procedures of the compiled source program may be updated easily.

As illustrated, because the object-program compile units and the source-program compile units compiled are stored in the same object program file 112, the user can carry out compile them when necessary with almost the same operability as in the conventional compilers. In addition, the present invention can be realized when the object-program compile units 601 for procedures and the source-program compile units 602 are stored respectively associated with one another on the storage device 106 even if the source program is not held in the same object-program file 112.

Figure 7:
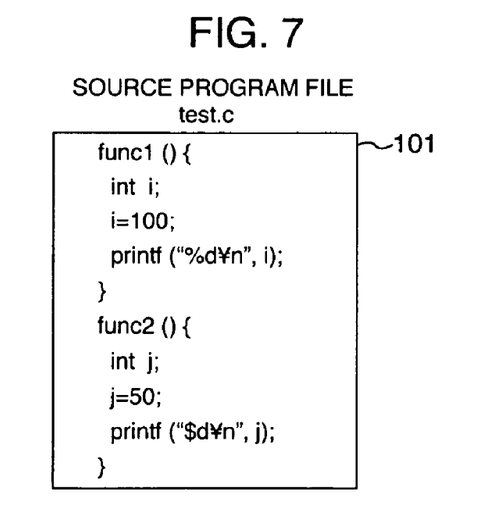
FIG. 7 shows an example of a source program file.

FIG. 7 is a diagram showing an example of a source program stored in a source program file 101. The source program has two procedures, func1 and func2. The compiler according to the present invention generates an object program file 112 shown in FIG. 8. The object program file 112 includes an object program part 1121 and a source program part 1122. The object program part 1121 includes an object-program compile unit 801 for func1 and an object-program compile unit 802, and the source program part 1122 includes a source-program compile unit 803 for func1 and a source-program compile unit 804 for func2, stored in a compile process, which respectively correspond to the object-program compile units 810 and 802.

Figure 8:
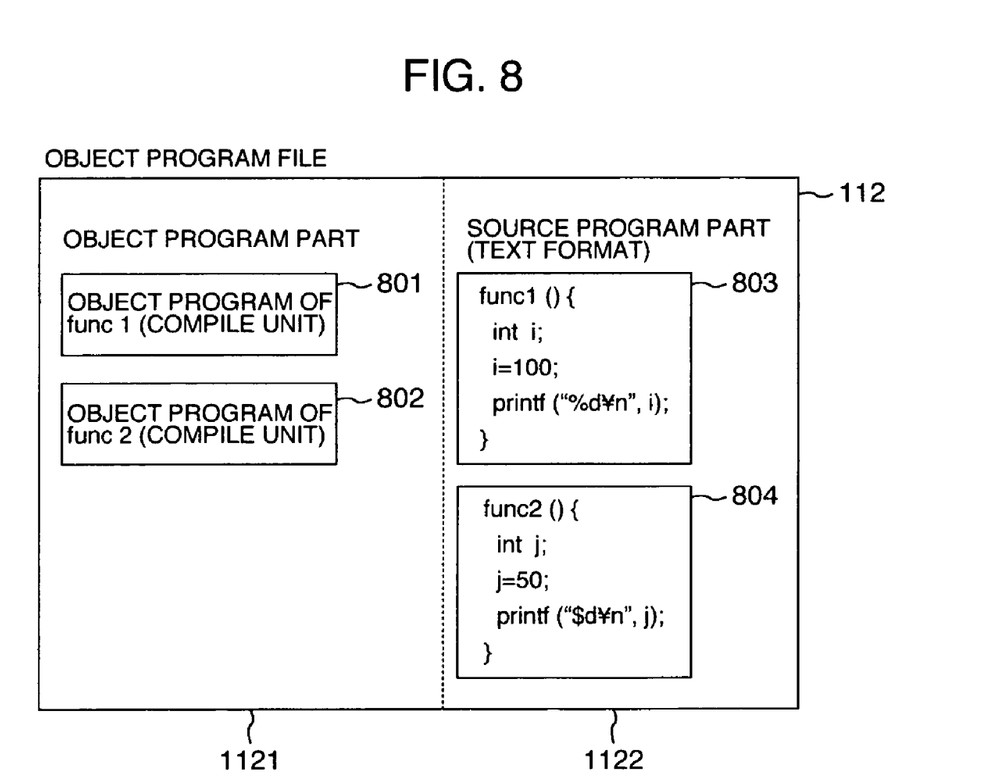
FIG. 8 shows a structure example of an object program file.

Description will next be made of a case where only the func1 in the source program file 101 is modified and recompiled. In the source program analyzer part 105, the compiler compares a source program file 101 with a compile unit 803 in a source program part of an object program file 112, and detects a change that occurred in func1. Then, in the object program file 109, the compiler compiles only a function func1, and updates an object-program compile unit 801 of a func1 and a source-program compile unit 803 of the function func1 in the object program file 112.

Figure 9:
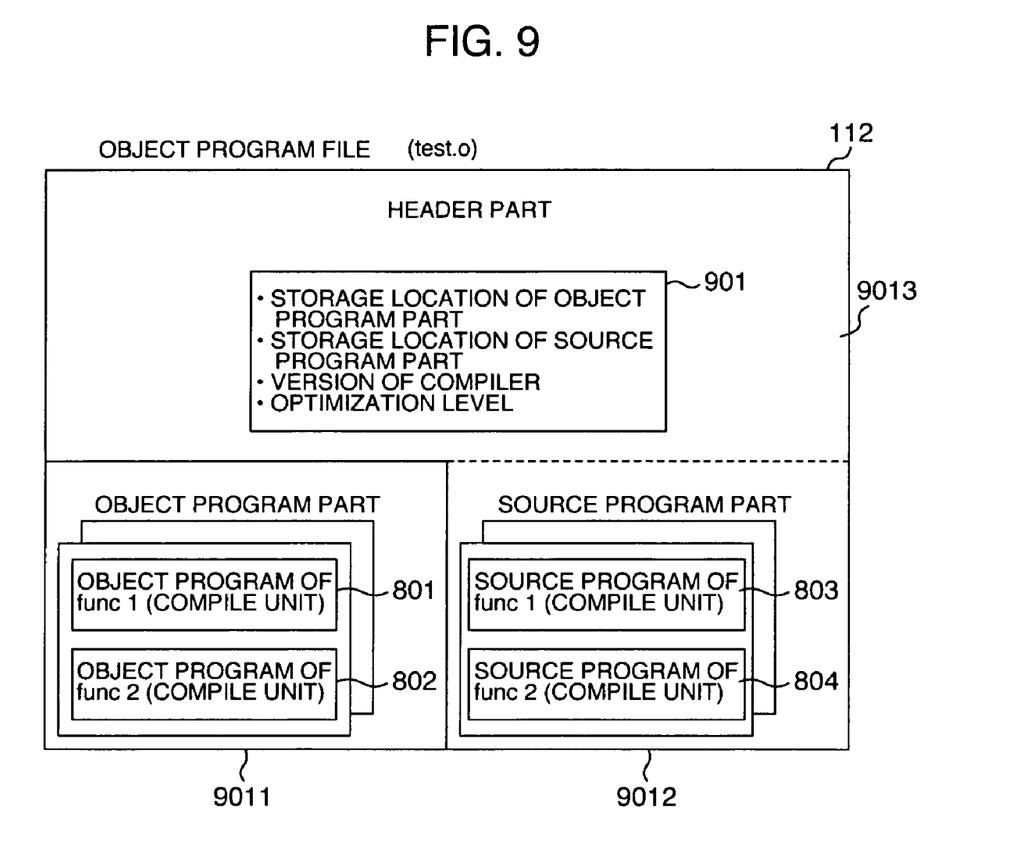
FIG. 9 shows a structure example of another object program file.

Referring to FIG. 9, description will be made of the structure of the object program file 112 output by the compiler according to the present invention. FIG. 9 shows a case where there are a plurality of source programs to be compiled. The object program file 112 includes an object program part 9011, a source program part 9012, and a header part 9013, which are output by the compiler. The header part 9013 holds storage locations in which object-program compile units and source-program compile units of individual procedures compiled are stored respectively associated with one another. Information 901 about the source program part 9012 and the header part 9013 is used as source information.

The header part 9013 holds the version of the compiler when the procedures were compiled and the level of optimization in the compile process carried out. When the compiler was replaced or the level of optimization was changed in the latest compiling, all procedures are compiled to unify the generation condition of the procedures. In such a case, it is impossible to detect which procedures to compile simply by comparing an input source program with source programs in the source program part 9012. Therefore, it is necessary to compare such items as the version of the compiler used and the selected level of optimization, an input option for example. By arranging for these items to be checked, even if the compiler is changed or if a different optimization level is used, unwanted omission of compilation can be avoided.

Note that the compiler 102 may be realized by loading a compiler program into the computer and running the program, but the compiler 102 may be implemented in the form of an integrated circuit or a ROM.

What is claimed is:

1. A compile method for generating an object program file stored in a storage device from a source program having a plurality of procedures, comprising the steps of:
   by regarding procedures of said source program as source-program compile units, compiling said source program on a procedure basis to generate said plurality of object-program compile units;
   in said object program file, storing said plurality of object-program compile units and said plurality of source-program compile units respectively associated with one another in said object program file, said plurality of source-program compile units being used to update said object program file on an object-program compile unit basis;
   in addition to storing said plurality of object-program compile units and said plurality of source-program compile units, storing information comprising storage information relating storage locations of source-program compile units with object-program compile units, and compiler information comprising compiler version and optimization level information in a header of said object program file;
   making a change in said source program compile units;
   comparing current compiler information with the compiler information stored in the object-program file header;
   if the current compiler information does not coincide with the compiler information stored in the object program file header, all source-program compile units are compiled;
   if the current compiler information matches the compiler information stored in the object program file header, comparing said changed source program compile units with said source-program compile units stored in said object program file;
   if both the source program compile units do not coincide, compiling the source-program compile units constituting said changed source program compile units, to generate a plurality of new object-program compile units; and
   updating said plurality of source-program compile units stored in said object program file so as to be the same as said plurality of source-program compile units constituting said changed source program, updating said plurality of object-program compile units stored in said object program file so as to be the same as said new object-program compile units, and updating said storage and compiler information stored in said object program file header so as to be the same as the current compiler information and a current storage information.

2. A compiler for generating an object program file stored on a storage device from a source program having a plurality of procedures, comprising:
   an input part for inputting said source program;
   a processing part for, by regarding procedures of said source program as source-program compile units, compiling said source program on a procedure basis to generate said plurality of object-program compile units;
   a processing part for storing said plurality of object-program compile units and said plurality of source-program compile units respectively associated with one another in said object program file, said plurality of source-program compile units being used to update said object program file on an object-program compile unit basis;
   a processing part for, in addition to storing said plurality of object-program compile units and said plurality of source-program compile units, storing information comprising storage information relating storage locations of source-program compile units with object-program compile units, and compiler information comprising compiler version and optimization level information in a header of said object program file;
   a processing part for making a change in said source program compile units;
   a processing part for comparing current compiler information with the compiler information stored in the object-program file header;
   a processing part for compiling all source-program compile units if the current compiler information does not coincide with the compiler information stored in the object program file header;
   a processing part for comparing said changed source program compile units with said source-program compile units stored in said object program file if the current compiler information matches the compiler information stored in the object program file header;
   a processing part for, if both the source program compile units do not coincide, compiling the source-program compile units constituting said changed source program compile units, to generate a plurality of new object-program compile units;
   a processing part for updating said plurality of source-program compile units stored in said object program file so as to be the same as said plurality of source-program compile units constituting said changed source program, and updating said plurality of object-program compile units stored in said object program file so as to be the same as said plurality of new object-program compile units, and updating said storage and compiler information stored in said object program file header so as to be the same as the current compiler information and a current storage information; and
   an output part for outputting said object program file.

3. A compile program executing a compile method for generating an object program file stored on a storage device from a source program having a plurality of procedures on a computer, comprising the steps of:

by regarding procedures of said source program as source-program compile units, compiling said source program on a procedure basis to generate said plurality of object-program compile units;

in said object program file, storing said plurality of object-program compile units and said plurality of source-program compile units respectively associated with one another in said object program file, said plurality of source-program compile units being used to update said object program file on an object-program compile unit basis;

in addition to storing said plurality of object-program compile units and said plurality of source-program compile units, storing information comprising storage information relating storage locations of source-program compile units with object-program compile units, and compiler information comprising compiler version and optimization level information in a header of said object program file;

making a change in said source program compile units;

comparing current compiler information with the compiler information stored in the object-program file header;

if the current compiler information does not coincide with the compiler information stored in the object program file header, all source-program compile units are compiled;

if the current compiler information matches the compiler information stored in the object program file header, comparing said changed source program compile units with said source-program compile units stored in said object program file;

if both the source program compile units do not coincide, compiling the source-program compile units constituting said changed source program compile units, to generate a plurality of new object-program compile units; and updating said plurality of source-program compile units stored in said object program file so as to be the same as said plurality of source-program compile units constituting said changed source program, updating said plurality of object-program compile units stored in said object program file so as to be the same as said new object-program compile units, and updating said storage and compiler information stored in said object program file header so as to be the same as the current compiler information and a current storage information.

* * * * *